April 23, 1963  G. WERRMANN  3,086,432
CAMERA WITH BUILT-IN PHOTOCELL-CONTROLLED
GALVANOMETER TYPE EXPOSURE METER
Filed Jan. 8, 1957  4 Sheets-Sheet 1

INVENTOR.
Gerhard Werrmann
BY *Spencer & Kaye*
ATTORNEYS

April 23, 1963  G. WERRMANN  3,086,432
CAMERA WITH BUILT-IN PHOTOCELL-CONTROLLED
GALVANOMETER TYPE EXPOSURE METER
Filed Jan. 8, 1957  4 Sheets-Sheet 3

INVENTOR.
Gerhard Werrmann
BY
*Spencer & Kaye*
ATTORNEYS

INVENTOR.
Gerhard Werrmann
BY
*Spencer & Kaye*
ATTORNEYS 3,086,432
CAMERA WITH BUILT-IN PHOTOCELL-CONTROLLED GALVANOMETER TYPE EXPOSURE METER
Gerhard Werrmann, Nurnberg, Germany, assignor to Carl Braun, Camerawerk, Nurnberg, Germany, a firm
Filed Jan. 8, 1957, Ser. No. 639,153
Claims priority, application Germany Feb. 10, 1956
1 Claim. (Cl. 95—10)

Cameras with built-in photocell-controlled galvanometer-type exposure meter are known in various constructions. Also known are cameras which, for the purpose of simplifying the setting movements required for exposures, comprise coupling means between the setting members and the photometric parts.

In many of these known constructions, the diaphragm-setting member is coupled to a control element which serves for regulating the light quantities falling upon the photocells, so that a stop change involves a change of the galvanometer-needle stroke. These known cameras, further, comprise coupling means between the shutter speed adjusting member and an indicating element associated with the galvanometer needle. These cameras thus render possible setting movements of the shutter speed adjusting and diaphragm members in accordance with the galvanometer-needle strokes, and they further permit to set stop values and shutter speed values adapted to the prevailing light conditions.

These known cameras, however, did not prove suitable for practical use, since the intricate construction of the transmitting members and, further, the requisite substantial finishing expense often gave cause to troubles and failures which often jeopardized the use of the cameras.

The disadvantages of the known cameras mentioned above are avoided according to my present invention by associating with the galvanometer needle an indicating element which through a control piece is so coupled to the diaphragm and shutter speed adjusting members as to initiate movements of the indicating element only in the wake of relative movements between said members. The advantages of the camera disclosed by the invention are first that the indicating element associated with the galvanometer needle is also coupled with said members, and second that movements of the indicating element only take place together with relative movements between said members, whereas setting movements of the latter in the same sense and through the same angles do not produce any change in the position of the indicating element. According to the invention, therefore, at a given setting of the ratio between diaphragm and shutter speed settings in correspondence with the principle of the light value, the diaphragm member is turnable simultaneously with the shutter speed adjusting member, giving due consideration to the light quantity required for an exposure. It further has proved of advantage that additional light-limiting means such as diaphragms applicable in front of the photocell for additionally influencing the light quantity falling upon the photocell, may be dispensed with.

Provision is made, within the scope of the invention, for interconnecting the indicating element associated with the galvanometer needle with the diaphragm and the shutter speed adjusting members through a link and a transmitting member connected therewith. The link connecting the two members, which preferably is of annular form, suitably is threaded over a portion of its length to be engaged by the threads of one of said members, whereas the link on the remaining portion of its length has a recess into which projects a lug or tenon of the other member. It has proved of particular advantage to interconnect the shutter speed adjusting member and the link by means of threads.

The design of the link according to the invention or, respectively, the type of coupling provided thereby between the two members is of such character that when one of the latter is moved, the link is axially and angularly moved, but solely is angularly moved when the two members are simultaneously moved, i.e. in the latter case the indicating element is not influenced. A definite and exact movement of the link is attainable, according to a further aspect of the invention, by axially immovably guiding the two members relatively to each other and relatively to the camera housing. The axial and angular movements of the link obtained on setting either or both of the members, suitably are transmitted to the transmitting piece articulated to the indicating element by forming the link end-face adjacent the camera interior as abutment against which abuts the free link-end, for example under the action of a spring.

Further, provision is made to form the diaphragm member of a diaphragm ring and a carrier therefor, said ring and its carrier being turnable in opposed relation and being preferably interconnected by clutch or catch means and the like. The two members are prevented from moving out of their adjustment, for example when setting one thereof, by catch means acting on said members. Any change in the setting of the latter thus only is possible by overcoming the resistance offered by said catch means.

Of particular importance for the invention are the scales arranged on the diaphragm and shutter speed adjusting rings. The spacings between two successive stop values correspond to those of two successive time values. Further, a light-value scale may be provided in place of the stop scale or, respectively, additionally to the latter.

The sensitivity of the photofilms used is taken into account by providing on the diaphragm ring a scale of film-sensitivity degrees, with which is associated an index on the diaphragm-ring carrier. For recognizing the stop value set, a fixed index is provided on the camera housing. When dispensing with the link coupling the two members, the opposite faces of the latter may be formed key-like or camlike. In such case also, the setting of the indicating element is not changed when resetting both members simultaneously, whereas said setting is automatically changed when moving the two members relatively to each other.

It is further proposed, within the scope of the invention and when using exchangeable objectives, to provide a coupling piece between the diaphragm segments disposed in the objective and the diaphragm member, which piece serves as transmitting element for the setting movements to be carried out with the diaphragm member. This coupling piece is an angled piece fixed to the diaphragm segment ring and its portion adjacent to the diaphragm member is coupled to the diaphragm ring of the latter. Coupling takes place in such manner that said piece abuts against a lug provided on the diaphragm ring under the action of a spring. When turning the diaphragm ring, therefore, said piece is angularly moved by the abutment of said ring against said piece on one hand and, when said ring is moving in the opposite direction, by the action of said spring.

According to a further feature of the invention, clamping means such as a threaded sleeve are provided for mounting the exchangeable objective on the camera housing. For the purpose of passing said angled piece through the threaded sleeve, the latter is provided with a segmental recess, the angle subtended by this recess being made greater than the turning angle of the diaphragm ring.

According to a further feature of the invention and for the purpose of establishing a connection between the shutter speed adjusting member and the shutter speed adjusting ring, the link which serves as coupling element for the diaphragm and shutter speed adjusting members is provided with an additional recess in which is engaged the shutter speed adjusting ring. The setting movements of the timing member, therefore, are transmitted through the link on to the shutter speed adjusting ring.

For securing the exchangeable objective to the camera housing, provision is made that first the coupling piece, i.e. said angle piece interconnecting the diaphragm segments and the diaphragm member, and the threaded sleeve are brought into a position predetermined by an index with respect to the objective mount before the latter is guided by a catch with respect to the camera housing and connected to the latter by means of said sleeve link. For identifying the setting of coupling piece and threaded sleeve with respect to the objective mount, a colored index such as a red spot is appropriate.

Two forms of my present invention are shown, by way of example, in the accompanying drawing, in which—

Figure 1:
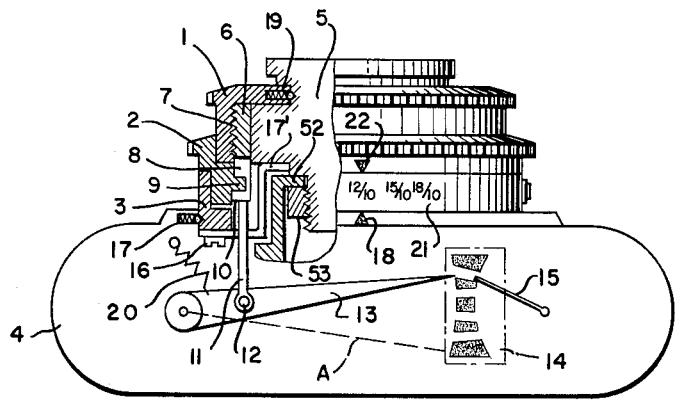
FIG. 1 is a schematic view of the first form of camera, partly in section.
Figure 2:
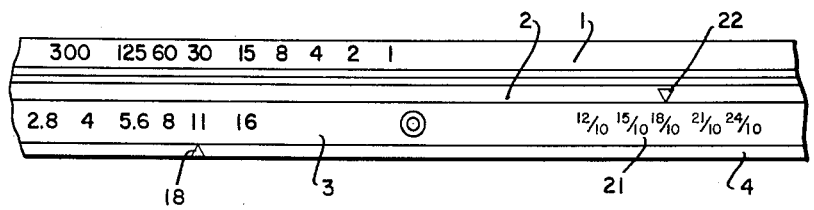
FIG. 2 is a view of the developed surface of the diaphragm and shutter speed adjusting members.

As shown in FIG. 1, the shutter speed adjusting member 1, the diaphragm-ring carrier 2 and the diaphragm ring 3 are held at fixed spacings respectively from the camera housing 4. Carrier 2 is a snug fit in ring 3, and member 1 is a medium or loose fit in carrier 2. On the lower threaded portion of the lens tube or shutter housing 5 is screwed a nut 53 which draws the housing 5 tightly on to a fixed collar or flange 52 which is integral with the camera housing 4. On the housing 5 of the shutter (not shown) is disposed a link 6 in parallel relation with the shutter axis, of which the portion remote from the camera interior is threaded at 7 for engagement with the shutter speed adjusting-member threads, and of which the portion adjacent the camera interior is recessed at 8 in its longitudinal direction. In recess 8 is engaged a lug 9 which is integral with diaphragm-ring carrier 2. The endface 10 of link 6 serves as abutment for a transmitting member 11 which at 12 is pivoted to the indicating element 13. With the latter is associated a galvanometer 14 which serves as exposure meter and of which the needle 15 is controlled by a photocell unit (not shown) disposed in the camera housing. Ring 3 is connected to the diaphragm segments 171 by a screw connection 16.

Figure 9:
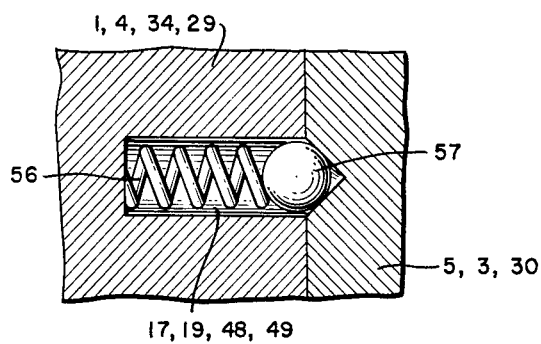
FIG. 9 is a view of a spring-loaded catch.
Figure 12:
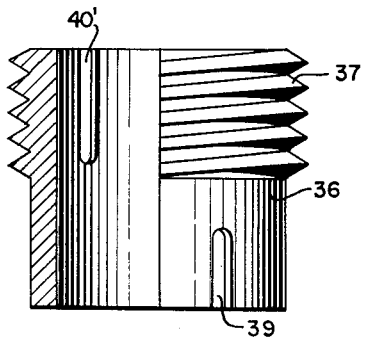
FIG. 12 is an elevation, at a much larger scale, of the sleeve link of FIG. 4.

The setting movements take place as follows: The camera user first determines either a stop or a time value as a guide for the contemplated exposure. Such guide is solely determined by the depth of focus or, respectively, the exposure time required in any given case. Let it be assumed that the camera user selects stop 11 as guide for a contemplated landscape exposure. The diaphragm ring 3 then is turned with respect to camera housing 4 in a manner known per se while overcoming the resistance offered by catch 17, until the stop value on ring 3 coincides with index 18 which is fixed on the camera housing 4. As shown in FIG. 9, catch 17 comprises a cylindrical recess provided in camera housing 4, a ball partly lodged in said recess and partly in a conical bore in ring 3, and a spring 56 for loading the ball. When setting the ring 3, link 6 is turned on account of the coupling between ring 3 and its carrier 2 and of the engagement of carrier lug 9 in link recess 8, whereby link 6 is moved axially via threads 7. Catch 19 constructed like catch 17 and interposed between member 1 and shutter housing 5, prevents member 1 from turning. The axial movement of link 6 produced by turning ring 3 is further transmitted on to member 11 and produces a change in the deflection of indicating element 13 which then, for example, occupies the position shown by the line A in FIG. 1.

Let it be further assumed that needle 15 occupies the position shown in FIG. 1 in accordance with the light quantity falling upon the photocell (not shown). The user determines the exposure time pertaining to the selected stop 11 while simultaneously setting the member 1 by turning the latter so far with respect to carrier 2 or ring 3 respectively, overcoming the resistance offered by catch 19, that element 13 occupies the position shown in FIG. 1. When turning member 1, link 6 also is axially moved on account of the non-turning holding effect afforded by lug 9, so that there exists an inter-relation of the extent of any axial movements of link 6. When either of the members 1 and 2, 3 are moved relatively to the other, link 6 is axially moved, whereas when said two members are angularly moved in the same sense and through the same angle, an axial movement of link 6 is prevented.

When the camera user chooses as guide a time value, the setting movement described above takes place in an analogous manner by first setting said value and then turning said ring 3 until needle 15 and indicating element 13 coincide and thus determine the appurtenant step. The spring means 20 connecting indicating-element 13 to housing 4 ensures a positive abutment of link 6 against transmitting member 11.

In order to take into account the sensitivity of the photographic film used, ring 3 is provided with a sensitivity scale 21 with which is associated an index 22 on ring carrier 2. By axially moving ring 3 and its carrier 2 relatively to each other, the film sensitivity is set. This suitably is done once and for all the exposures of a film, when inserting the latter into the camera.

Figure 3:
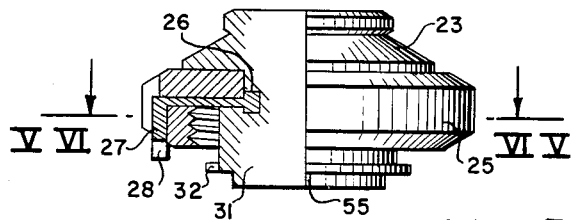
FIG. 3 shows an exchangeable objective, partly in section.
Figure 10:
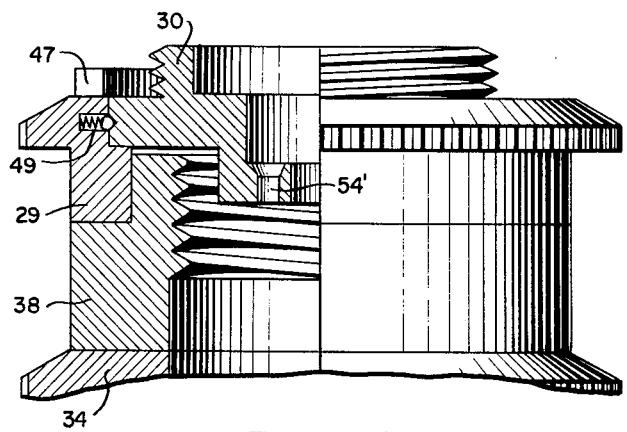
FIG. 10 shows a portion of the second example, i.e. of FIG. 4 at a much larger scale.
Figure 11:
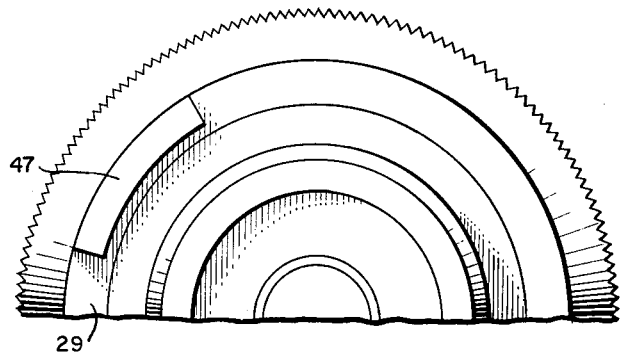
FIG. 11 is a partial top plan view of FIG. 10.

In the form of invention shown in FIGS. 3 to 6, the objective mount 23 comprises a threaded sleeve 25 which is provided with a recess 24. Through the latter projects an angle piece 27 which is coupled to the segment diaphragm 26 (FIG. 3). When mounting the exchangeable objective mount on the camera housing 4 shown in FIG. 4, the free end of piece 27 is coupled to diaphragm ring 29. On the lower threaded portion of shutter housing 5 is screwed a nut 53 which draws the housing 5 tightly on to a fixed collar or flange 52 which is integral with the camera housing 4. A lug 30 secured by screws 54 which project through bores 54′ (FIG. 10) and are engaged in threaded bores of shutter housing 5, then is engaged in a recess 31 of mount 23, and a flange 32 of the latter abuts against the annular face 33 of lug 30.

Figure 4:
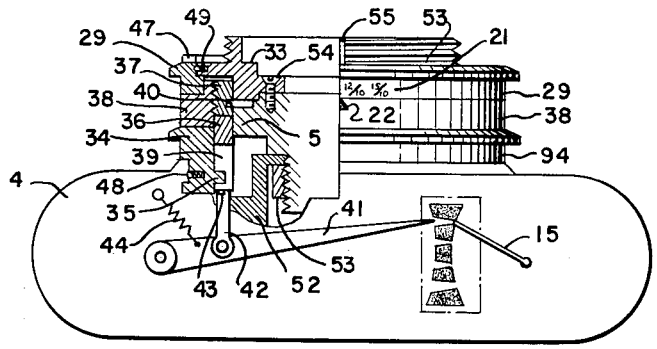
FIG. 4 shows the second form of camera with the diaphragm and shutter speed adjusting members, partly in section.
Figure 5:
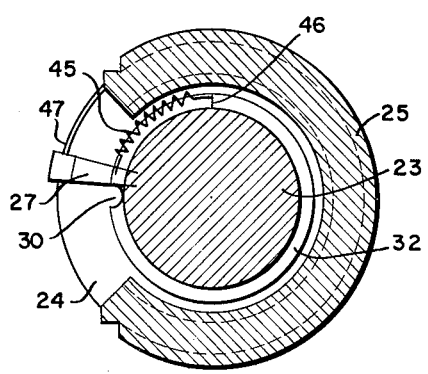
FIG. 5 is a section on the line V—V of FIG. 3.

As shown in FIG. 4, the shutter speed adjusting member 34 is coupled to the diaphragm-ring carrier 38 by means of a tenon 35 and via a link 36 and threads 37. Link 36 has a longitudinally extending recess 39 in which is engaged the shutter speed adjusting ring 40 of the shutter mechanism (not shown). The end face of link 36 adjacent the camera interior serves as abutment for the transmitting member 42 pivoted to indicating element 41, the endface 43 of member 42 abutting against the endface of link 36 under the action of a spring 44. Longitudinal movements of link 36 produce through member 42 a deflection of element 41. Turning or angular movements of link 36, however, do not produce any change in the position of element 41.

Figure 6:
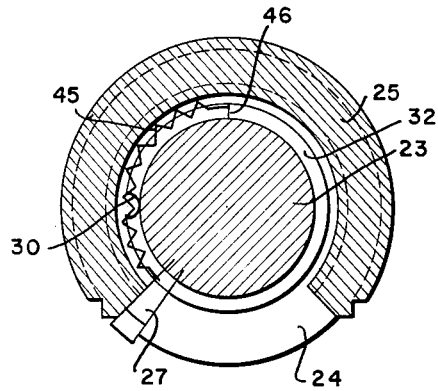
FIG. 6 is a section on the line VI—VI of FIG. 3.
Figure 8:
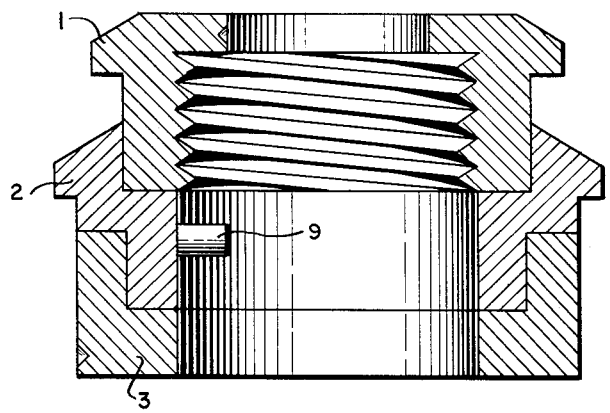
FIG. 8 is a sectional elevation of the latter two members of FIG. 1 at a much larger scale.
Figure 7:
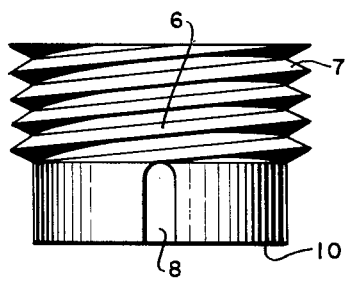
FIG. 7 is an elevation, at a much larger scale, of the sleeve link of FIG. 1 for interconnecting the diaphragm member and the shutter speed adjusting member.

For mounting the objective mount 23 in camera housing 4, threaded sleeve 25 and angle piece 27 are turned with respect to mount 23 until said sleeve occupies the position shown in FIG. 6. To faciltate such setting operation, an index such as a colored spot 55 is provided on mount 23. The latter thus set then is inserted into the camera housing 4, lug 30 being engaged in recess 31 of mount 23 and flange 32 of the latter abutting against annular face 33 of housing 4. Lug 30 affords a non-turnable location of mount 23 on housing 4, mount 23 being secured to the latter by sleeve 25. Angle piece 27 thus abuts against lug 47 of ring 29 by the action of a spring 45 of which one end is anchored to piece 27 and of which the other end at 46 is connected to mount 23. Therefore, when turning ring 29 or the latter's carrier which is connected to said ring through a catch or notch (not shown) or by friction, piece 27 may be angularly moved against the action of spring 45 for the purpose of changing the stop value. The angle of turn of ring 29 is smaller than the angle subtended by recess 24 of threaded sleeve 25. The diaphragm setting and shutter speed adjusting members are lockable with respect to the camera housing by the provision of catches 48 and 49 which are constructed similar to the catches 17 and 19 of the first example (FIGS. 1 and 9) and act between member 34 and camera housing 4 and lug 30 and diaphragm setting ring 29 respectively.

What I claim as new and desire to secure by Letters Patent, is:

The combination with a camera having a photographic intra-lens shutter structure and an exposure meter, and having diaphragm and shutter speed setting members disposed co-axially with respect to the axis of the shutter, of a control ring mounted on the shutter structure for axial and turning movement thereon, said control ring being separate from said setting members and movable with respect thereto, and being co-axial with the shutter structure and with said setting members; a movable tracing member associated with said exposure meter; drive means for actuating said tracing member in response to axial movement of the said control ring; and means for shifting said ring axially in response to relative turning movement of said setting members.

References Cited in the file of this patent

UNITED STATES PATENTS

| | | |
|---|---|---|
| 2,305,294 | Kuppenbender | Dec. 15, 1942 |
| 2,360,256 | Mihalyi | Oct. 10, 1944 |
| 2,418,370 | Simmon | Apr. 1, 1947 |
| 2,467,946 | Rossman | Apr. 19, 1949 |
| 2,596,328 | Dorsey | May 13, 1952 |

FOREIGN PATENTS

| | | |
|---|---|---|
| 756,282 | Germany | Feb. 23, 1953 |